(12) United States Patent
Pochmuller

(10) Patent No.: US 6,219,600 B1
(45) Date of Patent: Apr. 17, 2001

(54) UNDERCARRIAGE CONTROL SYSTEM

(75) Inventor: Werner Pochmuller, Hildesheim (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 09/146,477

(22) Filed: Sep. 3, 1998

(30) Foreign Application Priority Data

Sep. 4, 1997 (DE) .............................. 197 38 608

(51) Int. Cl.$^7$ ....................................... G06F 7/70
(52) U.S. Cl. .................... 701/37; 180/167; 180/197; 280/5.5
(58) Field of Search ................... 701/37, 38, 45; 180/167, 197; 340/901; 280/5.5, 5.515

(56) References Cited

U.S. PATENT DOCUMENTS

| 5,076,384 | 12/1991 | Wada et al. ............................ 180/169 |
| 5,446,291 | * 8/1995 | Becker et al. ................... 250/559.24 |
| 5,586,032 | * 12/1996 | Kallenbach et al. ..................... 701/45 |

FOREIGN PATENT DOCUMENTS

| 40 42 575 C2 | 5/1991 | (DE) . |
| 42 35 104 | 4/1994 | (DE) . |
| 42 35 104 A1 | 4/1994 | (DE) . |

OTHER PUBLICATIONS

Schramm, Wolfgang, Klaus, Landesfeind, Rainer: "A High Performance Concept for an Active Suspension with Reduced Consumption." *ATZ–Automobiltechnische Zeitschrift*, Nr. 94 (1992), p. 392–400.

Kallenbach, Rainer, Kunz, D., Schramm, Wolfgang: "Optimierung des Fahrzeugverhaltens mit Semiaktaven Fahrwerkregelungen." *VDI–Berichte*, Nr. 699 (1998), p. 121–135.

* cited by examiner

*Primary Examiner*—William A. Cuchlinski, Jr.
*Assistant Examiner*—Yonei Beaulieu
(74) *Attorney, Agent, or Firm*—Baker & Daniels

(57) ABSTRACT

An apparatus and method for controlling the undercarriage of a vehicle with means for adjusting vehicle parameters, such as, for example, the spring travel or the spring constant, in accordance with computed control signals. A signal receiving means receives signals from the environment of the vehicle and converts the signals into environmental signals. A signal processing means determines vehicle-related data from the environmental signals and a computing means computes the control signals for the vehicle control system with the aid of the vehicle-related data.

15 Claims, 3 Drawing Sheets

UNDERCARRIAGE CONTROL SYSTEM

BACKGROUND OF THE INVENTION

The invention concerns a device and a method for controlling the undercarriage of a vehicle with means for the adjustment of undercarriage parameters, such as, for example, the spring travel or the spring constant, in accordance with computed control signals. The invention is suitable for use in motor vehicles, particularly for use in passenger vehicles.

Undercarriage control systems have been used increasingly in passenger vehicles during recent years to enhance the comfort and safety of these vehicles. Such an undercarriage control system permits, for example, an adjustable damping characteristic or leveling control of the vehicle body independently of vehicle loading, in order to adapt the undercarriage to different road conditions.

Undercarriage control systems are classified according to their control characteristic as passive, adaptive, semiactive and active. An overview of the various control characteristics is provided in R. Kallenbach et al., Optimierung des Fahrzeugverhaltens mit semiaktiven Fahrwerkregelungen [Optimization of vehicle behavior by means of semiactive undercarriage control systems], VDI [Verein Deutscher Ingenieure; Association of German Engineers] Reports No. 699, 1988, pp. 121–135. The technical complexity of undercarriage control systems and their resultant cost depends on the desired control characteristic, and generally increase continuously from passive to active undercarriage control. The cited document describes in particular the optimization of vehicle behavior by means of semiactive undercarriage control systems, which offer a marked cost advantage over active undercarriage control systems.

A modern concept of undercarriage control is described in W. Schramm et al., "A high-performance concept for active undercarriage control with reduced energy demand," ATZ Automobiltechnische Zeitschrift 94 (1992), pp. 392–403. In particular, this article introduces a new concept for semiactive undercarriage control, consisting of a fully load-bearing hydropneumatic suspension with actuators in a shutoff-cylinder arrangement.

The sensing devices currently used in undercarriage control consist of travel sensors that determine the spring travel of the undercarriage at each axle, preferably at each wheel. From the present standpoint, optimum measurement acquisition would require measurement of the spring travel at each wheel suspension. Despite this high technical complexity and the associated high cost, due in particular to the use of a large number of sensors and a high available computation speed, as well as the provision of high-performance hydraulic, pneumatic and/or electrical final control elements to achieve a high control speed, the prior art undercarriage control systems are unable to achieve optimal and sufficiently rapid detection of all the situations that can arise during driving.

From digital image processing, methods and algorithms are known that can be used to identify at least partly preestablished structures and patterns in complex images and to filter them out of these images. Such methods can be used, for example, in medical technology for the automatic recognition of cancer cells in tissue specimens.

From automotive measurement technology, methods of distance measurement are known, for example involving the use of electromagnetic waves in various frequency ranges. In addition, modern navigational systems can be used in motor vehicles to furnish data regarding position and/or traffic flow.

The problem underlying the invention is to provide a device and a method for controlling the undercarriage of a motor vehicle that ensures a high degree of driving safety and driving comfort. In particular, the undercarriage control system should react quickly and optimally to all existing and immediately impending driving situations. Furthermore, the technical complexity and the associated production, installation and operating costs should be as low as possible.

SUMMARY OF THE INVENTION

The problem is solved, in a device for controlling the undercarriage of a vehicle, via means for the adjustment of vehicle parameters, such as, for example, the spring travel or the spring constant, in accordance with computed control signals, in that the device includes: signal receiving means for receiving signals from the environment of the vehicle and converting the signals into electrical environmental signals, signal processing means for determining vehicle-related data from the environmental signals, and computing means for computing the control signals for the undercarriage control system with the aid of the vehicle-related data. The signals from the environment of the vehicle can be either optical signals, for example in the form of images of the environment, electromagnetic signals from the environment, or radio signals from the environment, for example terrestrial or satellite-transmitted radio signals. Correspondingly, the signal receiving means can include, for example, a camera for receiving images, a radio antenna, or the like.

The device according to the invention offers the advantage that vehicle-related data are determined by the reception of signals from the environment of the vehicle and can be taken into account in the computation of the control signals for the undercarriage control system, so that the undercarriage control system no longer need rely solely on the measurement values determined directly on the vehicle, such as spring travel or spring deflection rate, in computing and adjusting the undercarriage parameters, but can also adjust—with foresight, so to speak—to immediately impending driving situations. On the one hand, this increases driving safety; on the other, it also nevertheless increases the reaction time available to the undercarriage control system, thereby lowering the requirements with regard to both computation speed and regulating speed. The lower requirements regarding computation speed can advantageously be utilized to achieve higher accuracy of computation, and thus higher driving safety. The lower requirements with regard to regulating speed, for example the requirement that the hydraulic, pneumatic or electrical final control elements provide appropriate spring pressure, permit the use of final control elements of smaller size, lower weight and lower power consumption. The device according to the invention further permits a high increase in driving safety, since the signal receiving means is able to detect imminent cornering or braking even before the driver of the vehicle reacts to the impending event. Furthermore, it is advantageous that devices already present in the vehicle can be used for the signal receiving means, for example a radio receiving antenna that is already on hand for the radio, or the data from a navigation system already present in the vehicle.

A particular embodiment of the invention is characterized by means for measuring transient vehicle-specific data, such as, for example, instantaneous speed or weight distribution, these transient vehicle-specific data being taken into account by the computing means in computing the control signals. This embodiment has the advantage the undercarriage control system can be optimized by the measurement and consideration of transient vehicle-specific data, thereby increasing driving safety. Transient vehicle-specific data are, for example, instantaneous speed, engine speed, transmission step, tuning angle of the steering wheel, weight, and weight distribution. It is advantageous if a number of these transient vehicle-specific data, such as speed, are already being measured routinely in the vehicle. In this way the cost of determining these data and using them for undercarriage control is, advantageously, low.

In a particular embodiment of the invention, the signal receiving means is formed by image receiving means for receiving images of the environment of the vehicle, and the signal processing means determines the road-related data through the use of digital image processing methods and algorithms. This embodiment has the advantage that the image receiving means delivers very relevant road-related data, particularly for imminent processes within the undercarriage control system. For example, the image receiving means, in association with digital image processing, can measure the lateral path of the driving lane immediately in front of the vehicle. In conjunction with transient vehicle-specific data, such as, for example, instantaneous speed and instantaneous turning angle of the steering wheel, the undercarriage control system can advantageously determine impending changes in the driving situation well in advance. In addition, it is advantageous if the image receiving means is able to determine not only static conditions, but also dynamic processes taking place in the area in front of the vehicle, such as a preceding vehicle that is braking, or an object moving toward the road from the side, such as a child moving toward the road. The device according to the invention thus offers the advantage that the undercarriage control system can prepare for the immediately impending braking process of the vehicle, and, for example, can counteract "dipping" of the vehicle by appropriate variation of the undercarriage parameters, for example the spring constant in the front axle.

According to a further particular embodiment of the invention, the image receiving means is positioned in a high position inside the vehicle, preferably between the rear-view mirror and the windshield, the image receiving means comprising a camera, preferably a CMOS (Complementary Metal Oxide Semiconductor) image sensor or a CCD (Charged Coupled Devices) camera. This high position of the image receiving means has the advantage that the image receiving means has a good overview of the area in front of the vehicle, and thus a good overview of the path of the road and the road conditions. It is further advantageous that with the image receiving means positioned between the rear-view mirror and the windshield in the vehicle interior, the field of view of the image receiving means is still located in an area that is swept by the windshield wiper blades. This ensures that the image receiving means will function reliably even under rainy conditions. It is further advantageous that the use of a CMOS image sensor or a CCD camera enables the image receiving means to have a small structural shape and low weight, so that it can readily be installed in the vehicle interior.

In a further particular embodiment of the invention, the image processing means determines the pitch angle of the vehicle. This is advantageous because it permits automatic leveling control of the vehicle in its longitudinal direction. Correspondingly, it is also possible to determine the roll angle or the yaw angle of the vehicle in relation to the road and to the radius of a curve that is to be negotiated.

The invention further includes an operating method for controlling the undercarriage of a vehicle in accordance with the device described hereinabove, and the use of signals from the environment of a vehicle, particularly images of the environment, to compute control signals for a vehicle undercarriage control system. The advantages of this method correspond to the advantages cited hereinabove in reference to the device according to the invention.

BRIEF DESCRIPTION OF THE DRAWINGS

Further advantages, features and details of the invention will emerge from the following description, in which plural exemplary embodiments are described in detail with reference to the drawings.

An approach to the implementation of the claimed invention is described in detail hereinbelow with reference to the drawings.

DESCRIPTION OF THE PREFERRED EMBODIMENT

Figure 1:
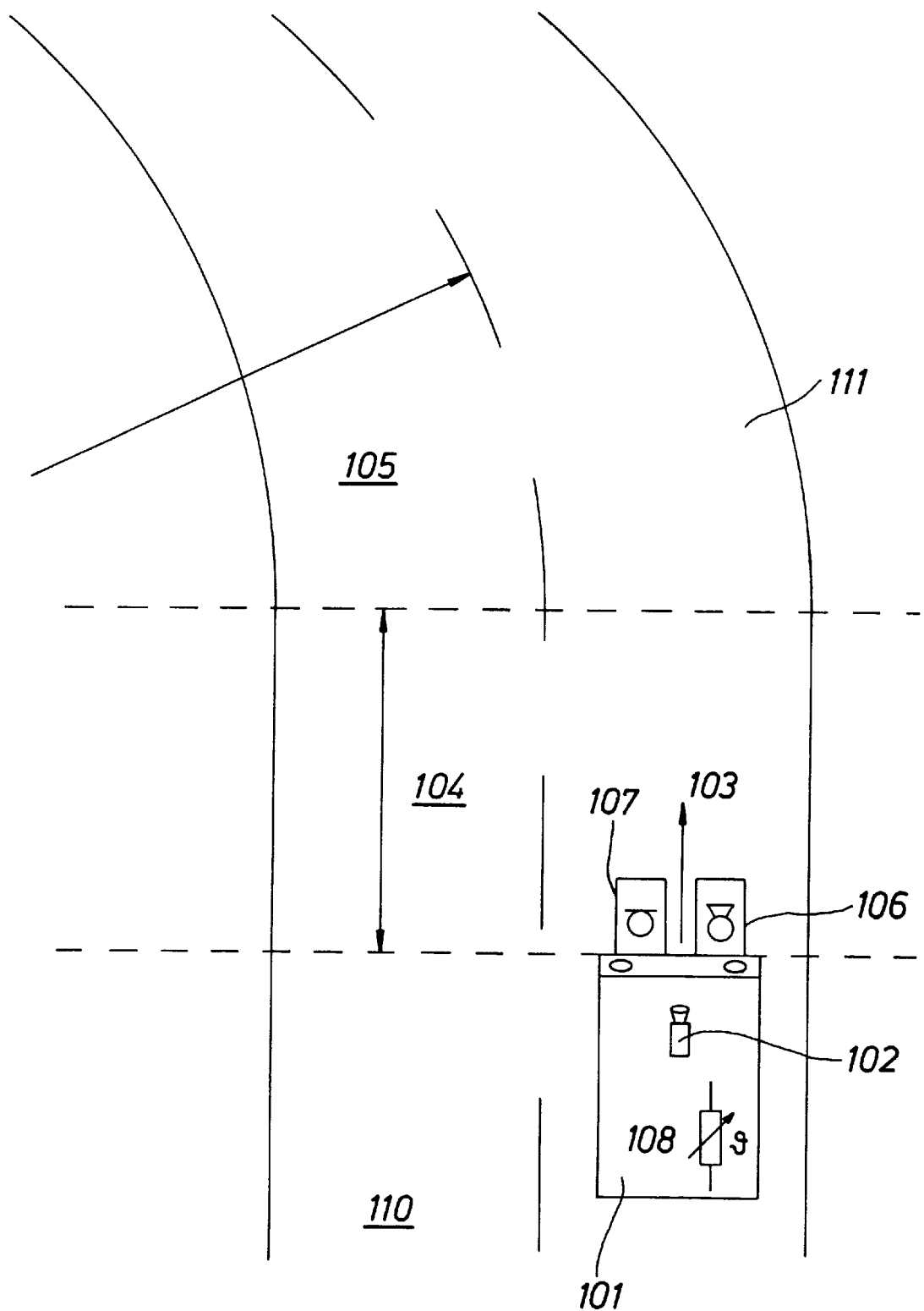
FIG. 1 shows a vehicle with an undercarriage control system according to the invention as it approaches a curve.

FIG. 1 shows a vehicle 101 with the undercarriage control system according to the invention, in particular with a camera 102. The vehicle 101 is traveling along the street 110 in direction 103 and is at distance 104 from a curve 111 with the radius 105. The camera 102, as the image receiving means or signal receiving means, converts the received signals into electrical environmental signals. A signal processing means in the vehicle 101 uses the electrical environmental signals to determine the distance 104 from the curve 111 and the radius 105 of the curve 111. The speed of the vehicle 101 could also be determined from the received image data. On the basis of the vehicle speed, the distance 104 to the curve and the radius 105 of the curve 111, the undercarriage control system according to the invention determines the vehicle parameters that must be set to ensure safe and comfortable negotiation of the curve. Also included in the calculation of the vehicle parameters are other data, which are, in the example shown, the electromagnetic signals transmitted by a transmitter 106 and reflected by the environment and received by a receiver 107. The transmitter and the receiver can be, for example, microwave-based radars or laser-based systems operating particularly in the infrared range. The electromagnetic signals permit conclusions regarding objects on the road or preceding vehicles. Further, the environmental temperature determined by means of a temperature sensor 108 is also taken into account in the calculation of the vehicle parameters.

Figure 2:
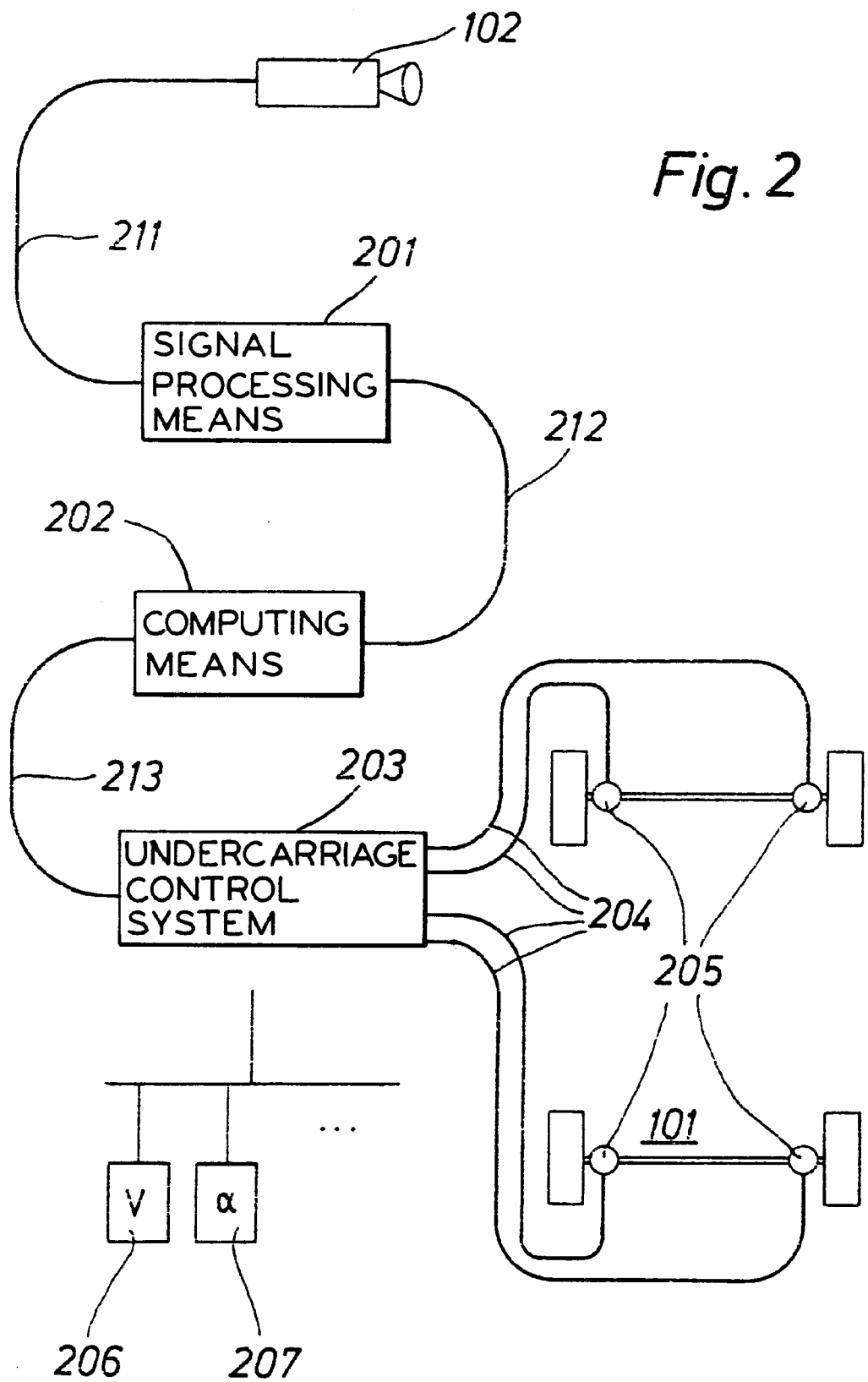
FIG. 2 shows the entire undercarriage control system according to the invention, with its components.

FIG. 2 depicts the entire vehicle control system according to the invention. The camera 102 receives the signals from the environment of the vehicle and converts these signals into electrical environmental signals 211. The signal processing means 201 uses these electrical environmental signals 211 to determine the vehicle-related data 212. Computing means 202 compute the control signals 213 for the undercarriage control system 203 with the aid of the vehicle-related data 212. The undercarriage control system 203 converts the control signals 213 into corresponding hydraulic, pneumatic or electrical control signals, which are relayed through corresponding leads 204 to the active undercarriage components 205. The environmental signals 211 are preferably electrical in nature, but, like the vehicle-related data 212 and the control signals 213, can also be of a different type, for example they can be transmitted optically via a fiberoptic cable. In the exemplary embodiment depicted, the undercarriage control system 203 also takes signals from the speed sensor 206 and signals from a measurement-value receiver 207 into account in determining the turning angle of the steering wheel. These two transient vehicle-specific parameters are cited solely as examples, and can be supplemented as needed by further transient vehicle-specific data, such as engine speed, transmission step, weight, or weight distribution. The transient vehicle-specific parameters 206, 207 can alternatively or additionally be made available to the computing means 202 for signal processing or can be taken into account by the computing means 202.

Figure 3:
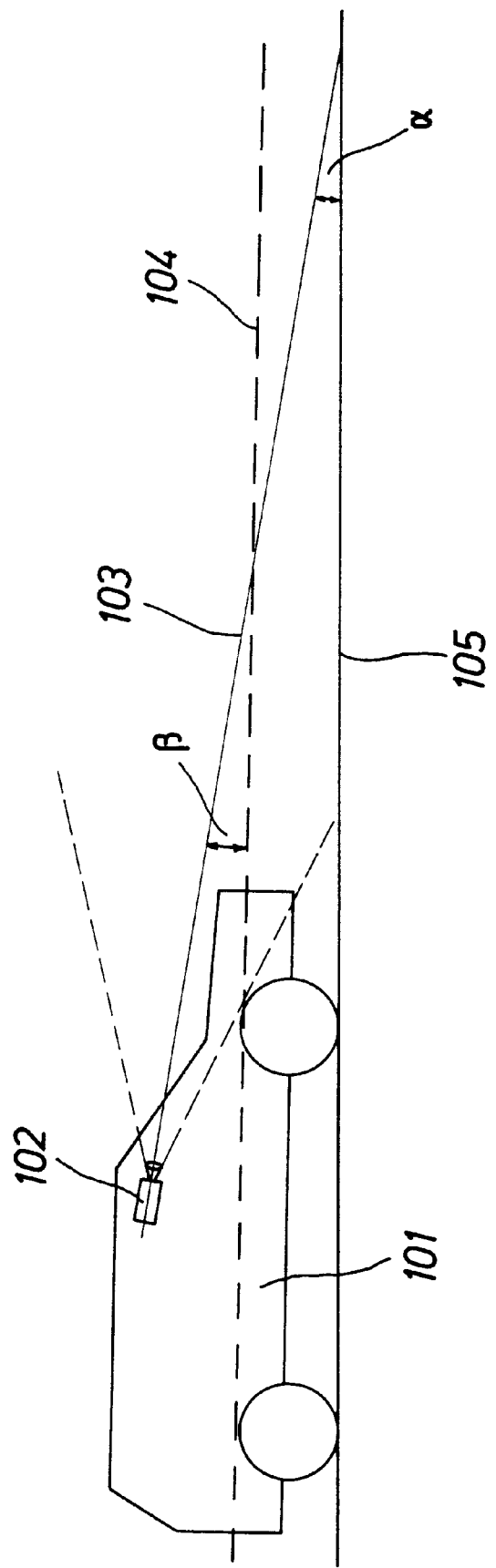
FIG. 3 shows a cross section of the vehicle and the road along the longitudinal axis of the vehicle.

FIG. 3 is a cross section along the longitudinal axis of the vehicle. In this example, the camera 102 is disposed comparatively high in the vehicle interior, behind the windshield, in such a way that it has a good "view" of the traffic in the direction of travel of the vehicle and also is still located within the radius of action of the wiper blades of the vehicle 101. The camera 102 is fixedly attached to the vehicle 101. The optical axis 103 of the camera 102 forms an angle β with a horizontal axis 104 of the vehicle 101. The image processing means according to the present invention determines the angle α formed by the optical axis 103 of the camera 102 and the plane 105 of the road. Since angle β is invariable and is known to the control system, the difference between the known angle β and the measured angle α can be used to determine the pitch angle of the vehicle 101.

The camera 102 can be, for example, a CMOS image sensor or a CCD camera. In the case of a CMOS image sensor, it is advantageous to provide a characteristic curve whose slope decreases with increasing luminous intensity. It is particularly useful to provide a logarithmic characteristic curve.

It is further possible to use a plurality of optionally synchronized cameras, in particular with different settings, e.g. different focal lengths.

What is claimed is:

1. A apparatus for controlling the undercarriage of a vehicle, said apparatus comprising
    a means for adjusting undercarriage parameters in accordance with computed control signals,
    signal receiving means for receiving signals from an environment surrounding the vehicle and for converting the received signals into environmental signals,
    signal processing means for determining road-related data from said environmental signals, and
    computing means for computing control signals for the undercarriage control system based on said road-related data and for controlling the adjustment of said undercarriage parameters.

2. An apparatus according to claim 1, including means for measuring transient vehicle-specific data, the computing means utilizing said transient vehicle-specific data in computing the control signals.

3. An apparatus according to claim 1, wherein the signal processing means determines the road-related data with the aid of digital image processing methods and algorithms.

4. An apparatus according to claim 1 including an image receiving means for transmitting images of the environment of the vehicle to the signal receiving means.

5. An apparatus according to claim 4, wherein the image receiving means is positioned in a high position in the interior of the vehicle between the rear-view mirror and the windshield.

6. An apparatus according to claim 4 wherein the image receiving means comprises a camera.

7. An apparatus according to claim 4 wherein the signal processing means determines a pitch angle of the vehicle.

8. A method for controlling the undercarriage of a vehicle which includes an undercarriage control system, said method comprising:
    receiving signals from an environment surrounding the vehicle,
    converting the received signals into environmental signals
    determining road-related data from the environmental signals;
    computing control signals for the undercarriage control system using the road-related data; and
    adjusting vehicle parameters using the control signal.

9. A vehicle including an apparatus for controlling an undercarriage of the vehicle, said apparatus comprising:
    a means for adjusting undercarriage parameters in accordance with computed control signals,
    a signal receiving means for receiving signals from an environment surrounding the vehicle and for converting the received signals into environmental signals,
    a signal processing means for determining road-related data from said environmental signals, and
    computing means for computing control signals based upon said road-related data and for controlling adjustment of said undercarriage parameters.

10. A vehicle according to claim 9, including means for measuring transient vehicle-specific data, the computing means utilizing said transient vehicle-specific data in computing the control signals.

11. A vehicle according to claim 9, wherein the signal processing means determines the road-related data with the aid of digital image processing methods and algorithms.

12. A vehicle according to claim 9, including an image receiving means for transmitting images of the environment of the vehicle to the signal receiving means.

13. A vehicle according to claim 9, wherein the image receiving means is positioned in a high position in the interior of the vehicle, between the rear-view mirror and the windshield.

14. A vehicle according to claim 9, wherein the image receiving means comprises a camera.

15. A vehicle according to claim 9, wherein the signal processing means determines a pitch angle of the vehicle.

* * * * *